US012769237B2

(12) United States Patent
Yamashita

(10) Patent No.: US 12,769,237 B2
(45) Date of Patent: Oct. 20, 2026

(54) IMAGE FORMING SYSTEM AND METHOD HAVING A DETECTOR FOR SHEET PROPERTY DETERMINATION AND READER

(71) Applicant: KONICA MINOLTA, INC., Tokyo (JP)

(72) Inventor: Isao Yamashita, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/593,747

(22) Filed: Mar. 1, 2024

(65) Prior Publication Data

US 2024/0302778 A1 Sep. 12, 2024

(30) Foreign Application Priority Data

Mar. 10, 2023 (JP) ................................ 2023-037629

(51) Int. Cl.
*G03G 15/00* (2006.01)
*G03G 15/20* (2006.01)

(52) U.S. Cl.
CPC ..... *G03G 15/5033* (2013.01); *G03G 15/2064* (2013.01); *G03G 2215/00734* (2013.01); *G03G 2215/00776* (2013.01)

(58) Field of Classification Search
USPC ........................................................... 399/44
See application file for complete search history.

(56) References Cited

U.S. PATENT DOCUMENTS 8,885,211 B1 11/2014 Mcdonnell
10,129,441 B2 * 11/2018 Itagaki ............... H04N 1/00034
2009/0086295 A1 4/2009 Murakami
2012/0315053 A1 * 12/2012 Kudo ..................... G03G 15/50 399/346
2013/0011151 A1 * 1/2013 Watanabe ............ G03G 15/161 399/302
(Continued)

FOREIGN PATENT DOCUMENTS

GB 2156277 A * 10/1985 ......... G03G 15/2064
JP 2009046218 A * 3/2009
(Continued)

OTHER PUBLICATIONS

Final Office Action dated Jun. 30, 2026 issued in co-pending U.S. Appl. No. 18/593,737.
(Continued)

*Primary Examiner* — Quana Grainger
(74) *Attorney, Agent, or Firm* — SQUIRE PATTON BOGGS (US) LLP

(57) ABSTRACT

An image forming system includes an image former, a detector, and a first reader. The image former forms an image on a recording medium. The detector is provided upstream of the image former in a conveyance direction of the recording medium, and detects a physical property of the recording medium. The first reader is provided downstream of the image former in the conveyance direction of the recording medium, and reads the recording medium. The first reader is controlled based on a detection result of the detector, and the detector is controlled based on a reading result of the first reader.

5 Claims, 8 Drawing Sheets

(56) References Cited

U.S. PATENT DOCUMENTS

| | | | | |
|---|---|---|---|---|
| 2013/0195534 | A1* | 8/2013 | Oohara | G03G 15/6576 399/406 |
| 2014/0029996 | A1* | 1/2014 | Nozawa | G03G 15/1695 399/388 |
| 2017/0075272 | A1* | 3/2017 | Kimura | G03G 15/5025 |
| 2018/0150008 | A1* | 5/2018 | Suzue | G03G 15/5029 |
| 2019/0324696 | A1 | 10/2019 | Matsuda et al. | |
| 2020/0356318 | A1 | 11/2020 | Wei et al. | |
| 2021/0141572 | A1 | 5/2021 | Kuroda | |
| 2022/0156019 | A1 | 5/2022 | Kanamoto et al. | |
| 2022/0156020 | A1 | 5/2022 | Iida et al. | |
| 2022/0201150 | A1 | 6/2022 | Manabe | |
| 2022/0253260 | A1 | 8/2022 | Tanaka | |
| 2022/0263963 | A1 | 8/2022 | Aoyagi et al. | |
| 2022/0308800 | A1 | 9/2022 | Takahashi et al. | |
| 2022/0334520 | A1* | 10/2022 | Nishi | G03G 15/5062 |
| 2023/0035820 | A1 | 2/2023 | Kimata et al. | |
| 2023/0095964 | A1 | 3/2023 | Mine et al. | |
| 2024/0303004 | A1 | 9/2024 | Shimura | |
| 2024/0305720 | A1 | 9/2024 | Yamashita | |

FOREIGN PATENT DOCUMENTS

| | | |
|---|---|---|
| JP | 2010-066516 A | 3/2010 |
| JP | 2020-116752 A | 8/2020 |
| JP | 2021-105629 A | 7/2021 |

OTHER PUBLICATIONS

Notice of Reasons for Refusal dated May 26, 2026 issued in corresponding Japanese Patent Application No. 2023-035356, with English language translation thereof.

* cited by examiner

IMAGE FORMING SYSTEM AND METHOD HAVING A DETECTOR FOR SHEET PROPERTY DETERMINATION AND READER

CROSS-REFERENCE TO RELATED APPLICATION

Japanese patent application No. 2023-037629 filed on Mar. 10, 2023, including description, claims, drawings, and abstract the entire disclosure is incorporated herein by reference in its entirety.

BACKGROUND OF THE INVENTION

1. Technical Field

The present invention relates to an image forming system and a method of controlling an image forming system.

2. Description of Related Art

An image forming system is known in which sheet readers are installed at a plurality of places on a sheet conveyance path and a reading operation is performed on a conveyed sheet in order to improve accuracy in sheet conveyance control, cutting position control, printing position control, and the like (for example, Japanese Unexamined Patent Application Publication No. 2021-105629).

SUMMARY OF THE INVENTION

However, in the image forming system including the plurality of sheet readers, it takes time for a service technician to identify a failed location due to complication of a configuration. Therefore, there is a possibility that time during which the image forming system cannot be used due to a failure (that is, downtime) increases.

The present invention has been made in consideration of the above-described circumstances, and an object of the present invention is to provide an image forming system capable of suppressing an increase in downtime due to complication of a configuration of an image forming system, and a method of controlling the image forming system.

To achieve at least one of the abovementioned objects, according to an aspect of the present invention, an image forming system reflecting one aspect of the present invention comprises the followings.

An image forming system including: an image former that forms an image on a recording medium; a detector that is provided upstream of the image former in a conveyance direction of the recording medium and detects a physical property of the recording medium; and a first reader that is provided downstream of the image former in the conveyance direction of the recording medium and reads the recording medium, in which the first reader is controlled based on a detection result of the detector, and the detector is controlled based on a reading result of the first reader.

To achieve at least one of the abovementioned objects, according to an aspect of the present invention, an image forming system reflecting one aspect of the present invention comprises the followings.

An image forming system including: an image former that forms an image on a recording medium; a detector that is provided upstream of the image former in a conveyance direction of the recording medium and detects a physical property of the recording medium; a first reader that is provided downstream of the image former in the conveyance direction of the recording medium and reads the recording medium; and a determiner that determines an abnormality of at least one of the detector or the first reader based on a detection result of the detector and a reading result of the first reader.

DETAILED DESCRIPTION

Figure 1:
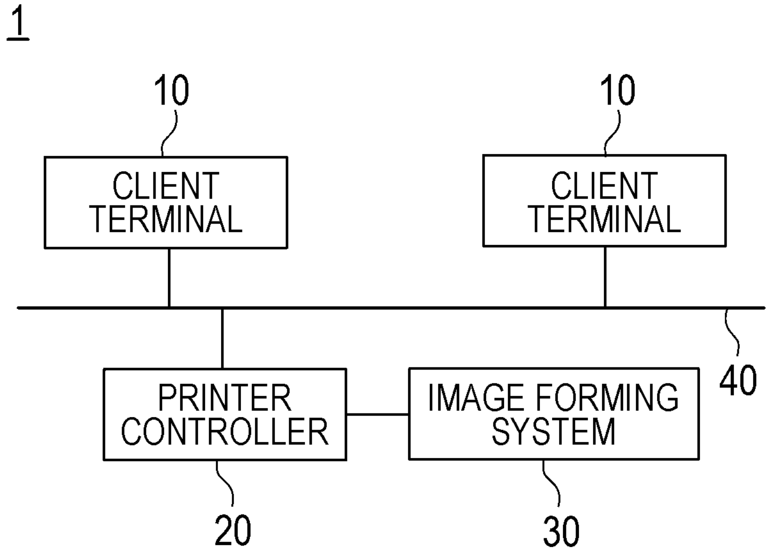
FIG. 1 is a schematic block diagram of a printing system according to a first embodiment of the present invention.

Hereinafter, one or more embodiments of the present invention will be described with reference to the drawings. However, the scope of the invention is not limited to the disclosed embodiments.

In the description of the drawings, the same elements are denoted by the same reference signs, and redundant description thereof will be omitted. In addition, dimensional ratios in the drawings are exaggerated for convenience of description and may be different from actual ratios.

First Embodiment

<Configuration of Printing System>

FIG. 1 is a schematic block diagram for describing a configuration of a printing system 1 according to a first embodiment of the present invention. As illustrated in FIG. 1, the printing system 1 includes a client terminal 10, a printer controller 20, and an image forming system 30. The client terminal 10, the printer controller 20, and the image forming system 30 are communicably connected to each other via a communication line 40.

The client terminal 10 can be, for example, a personal computer, a tablet terminal, a smartphone, or the like. A printer driver for converting document data into a print job is installed in the client terminal 10. The printer driver generates a print job in a format compatible with the printer controller 20, and transmits the print job to the printer controller 20 through the communication line 40.

The print job includes, for example, print data and print setting data in a page description language (PDL) format. The print setting data includes information about the number of pages, the number of copies, a type, size, and basis weight of a sheet, setting of an inspection function, setting of single-sided printing or double-sided printing, and the like.

The communication line 40 can include a local area network (LAN) in which computers or network devices are connected to each other in accordance with standards such as Ethernet (registered trademark), fiber distributed data interface (FDDI), and wireless fidelity (Wi-Fi), a wide area network (WAN) in which LANs are connected to each other by a dedicated line, or the like.

Note that the number of constituent elements connected to the communication line 40 is not limited to the case exemplified in FIG. 1.

<Configuration of Printer Controller>

Figure 2:
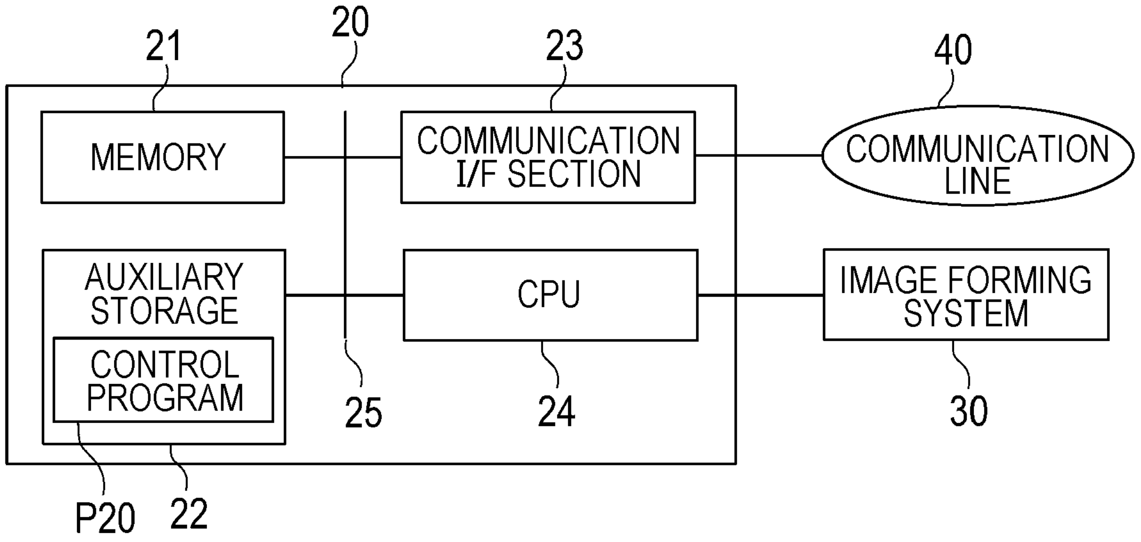
FIG. 2 is a schematic block diagram exemplifying a hardware configuration of a printer controller illustrated in FIG. 1.

FIG. 2 is a schematic block diagram exemplifying a hardware configuration of the printer controller 20 illustrated in FIG. 1. The printer controller 20 generates print image data and transmits the print image data to the image forming system 30.

The printer controller 20 includes a memory 21, an auxiliary storage 22, a communication I/F section 23, and a central processing unit (CPU) 24, and these constituent elements are connected by an internal bus 25. The memory 21 includes a random access memory (RAM) and a read only memory (ROM) (not illustrated). The RAM is a high-speed accessible main storage device that temporarily stores a program and transmission/reception data as a work area. The ROM stores various programs and various data.

The auxiliary storage 22 includes, for example, a large-capacity storage device such as a solid state drive (SSD) or a hard disk drive (HDD), and stores various programs including an operating system, a control program P20, and the like.

The communication I/F section 23 is an interface for transmitting and receiving data to and from the client terminal 10 via the communication line 40.

The CPU 24 executes various kinds of determination processing and calculation processing in order to generate a print image in accordance with the various programs and control the communication I/F section 23 and the image forming system 30. The functions of the printer controller 20 are implemented by the CPU 24 executing programs respectively corresponding to the functions. The printer controller 20 analyzes the print job received from the client terminal 10 via the communication line 40. The printer controller 20 executes processing such as color conversion, screening, and rasterizing, and generates print image data in a bitmap format.

<Configuration of Image Forming System>

Figure 3:
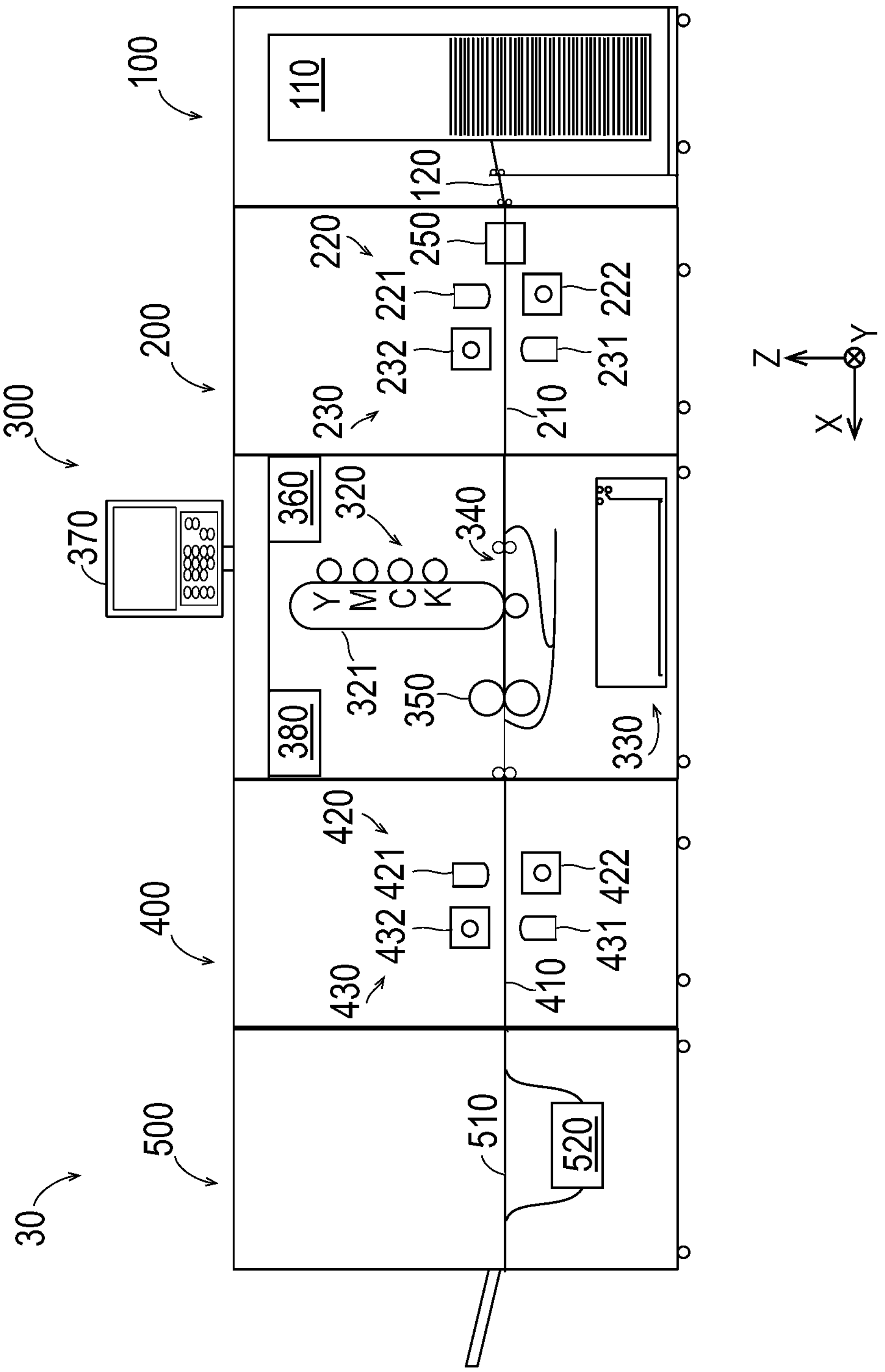
FIG. 3 is a diagram exemplifying a schematic configuration of an image forming system illustrated in FIG. 1.
Figure 4:
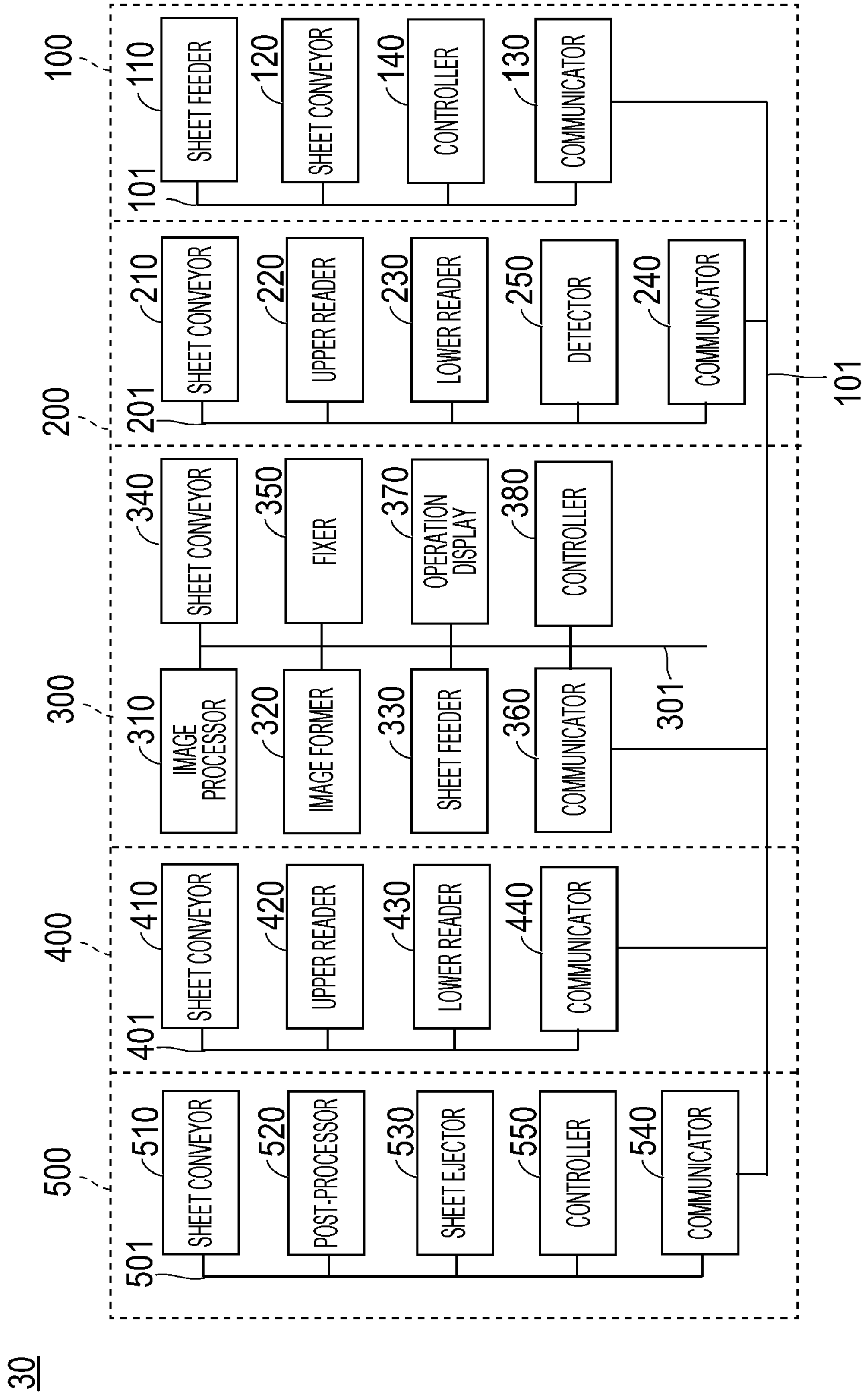
FIG. 4 is a schematic block diagram of the image forming system illustrated in FIG. 1.
Figure 5:
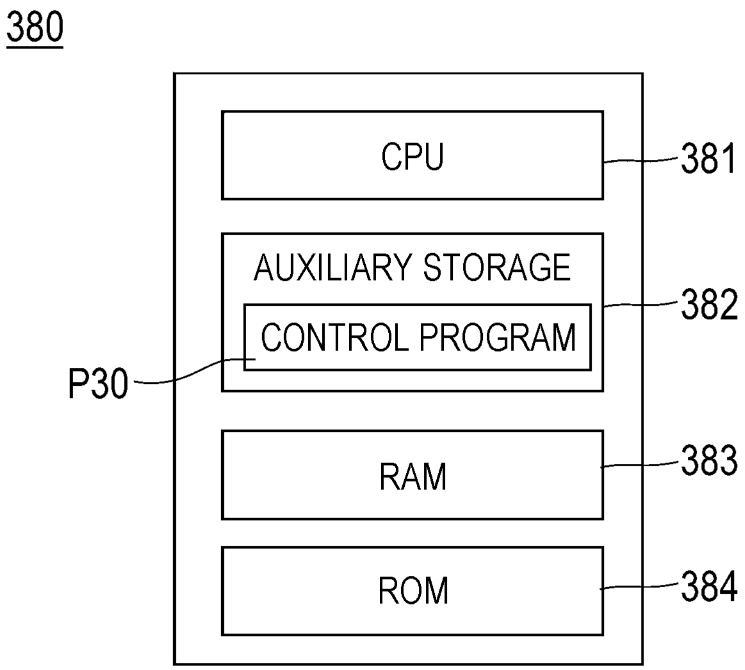
FIG. 5 is a schematic block diagram exemplifying a configuration of a controller of the image forming system illustrated in FIG. 4.

FIG. 3 is a diagram exemplifying a schematic configuration of the image forming system 30 illustrated in FIG. 1, and FIG. 4 is a schematic block diagram of the image forming system 30 illustrated in FIG. 1. FIG. 5 is a schematic block diagram exemplifying a configuration of a controller 380 of the image forming system 30 illustrated in FIG. 4.

As illustrated in FIG. 3, the image forming system 30 of the present embodiment includes a sheet feed device 100, an upstream reading device 200, an image forming apparatus 300, a downstream reading device 400, and a post-processing device 500 that are connected in series in an X direction (conveyance direction). Note that the configuration of the image forming system 30 illustrated in FIG. 3 is an example, and the type and the number of devices included in the image forming system 30 are not limited to the example illustrated in FIG. 1.

<Sheet Feed Device 100>

The sheet feed device 100 supplies a sheet as a recording medium to the upstream reading device 200 in response to an instruction of the image forming apparatus 300. As illustrated in FIG. 4, the sheet feed device 100 includes a sheet feeder 110, a sheet conveyor 120, a communicator 130, and a controller 140. The sheet feeder 110, the sheet conveyor 120, the communicator 130, and the controller 140 are connected to each another by an internal bus 101.

The sheet feeder 110 includes at least one sheet feed tray and accommodates sheets to be used for printing. Sheets S accommodated in the sheet feed tray are supplied one by one to the upstream reading device 200 by a plurality of conveyance roller pairs along a sheet conveyance path of the sheet conveyor 120. Note that the recording medium is not limited to a paper sheet, and may be a film-like sheet or the like.

The communicator 130 exchanges a control signal or data with the image forming apparatus 300. The controller 140 controls the sheet feeder 110, the sheet conveyor 120, and the communicator 130 by executing a control program for the sheet feed device 100.

<Upstream Reading Device 200>

In response to an instruction from the controller 380, the upstream reading device 200 reads the sheet S conveyed from the sheet feed device 100. The upstream reading device 200 includes a sheet conveyor 210, an upper reader 220, a lower reader 230, and a communicator 240. These constituent elements are communicably connected to each other via an internal bus 201. The upper reader 220 and/or the lower reader 230 constitute a second reader.

The sheet conveyor 210 includes a sheet conveyance path and a plurality of conveyance roller pairs and conveys the sheet S supplied from the sheet feed device 100 toward the image forming apparatus 300 along the sheet conveyance path.

The upper reader 220 includes an upper scanner 221 installed on an upper side of the sheet conveyance path of the sheet conveyor 210, and a first background member 222 opposed to the upper scanner 221 and installed on a lower side of the sheet conveyance path. The lower reader 230 includes a lower scanner 231 installed on the lower side of the sheet conveyance path of the sheet conveyor 210, and a second background member 232 opposed to the lower scanner 231 and installed on the upper side of the sheet conveyance path.

The upper scanner 221 includes an optical system including an image sensor, a lens, and a mirror, a light emitting diode (LED) light source, and a controller. The lower scanner 231 has a similar configuration to the upper scanner 221. The upper scanner 221 and the lower scanner 231 are configured to be operable independently of each other.

The image sensor can be, for example, a charge coupled device (CCD) line sensor or a complementary metal oxide semiconductor (CMOS) line sensor. The upper scanner 221 and the lower scanner 231 may be configured by using a contact image sensor (CIS). The controller includes a CPU, memories (RAM and ROM), an auxiliary storage, and the like, controls the optical system and the light source, and thus implements various functions as a color scanner, such as a function of reading a color image.

The first background member 222 is, for example, a member having a prismatic shape (for example, a quadrangular prism shape), and a plurality of side surfaces of the member have different colors (for example, black and white). The controller of the upper reader 220 controls a drive source (not illustrated) to rotate a central axis of the first background member 222. Accordingly, the controller of the upper reader 220 can change a background used for reading the sheet S to a different color (black or white). For example, when a white or light-colored sheet S is read, a black surface of the first background member 222 can be used as the background. When a black or dark-colored sheet S is read, a white surface of the first background member 222 can be used as the background. The second background member 232 has a similar configuration to the first background member 222.

The upper scanner 221 is configured to be able to read an area in a range wider than a size (length and width) of the sheet S when the sheet S is conveyed on a sheet conveyance path on the first background member 222. The size of the sheet S includes the four sides of the sheet S and a part of the first background member 222 near the four sides. Similarly, the lower scanner 231 is configured to be able to read a range wider than the size of the sheet S including the four sides of the sheet S and a part of the second background member 232 near the four sides when the sheet S is conveyed on a sheet conveyance path on the second background member 232.

Specifically, the upper scanner 221 reads a range wider than the width of the sheet S on a front surface (upper surface) in a main scanning direction (Y direction) orthogonal to the X direction (sheet conveyance direction) in which the sheet S is conveyed. The upper scanner 221 repeats reading of the sheet S a plurality of times while the sheet S is being conveyed on the sheet conveyance path by the sheet conveyor 210, to acquire read image data of the front surface of the sheet S. Furthermore, the lower scanner 231 reads a range wider than the width of the sheet S in a width direction on a back surface (lower surface) of the sheet S. The lower scanner 231 repeats reading of the sheet S a plurality of times while the sheet S is being conveyed on the sheet conveyance path to acquire read image data of the back surface of the sheet S. The read image data of the front surface and the back surface read by the upper scanner 221 and the lower scanner 231 is transmitted to the controller 380 of the image forming system 30. Note that instead of using a line sensor as the image sensor, read image data may be acquired by using a sensor that reads an image by scanning pixels in the X direction.

The upper scanner 221 detects a leading end and a trailing end of the sheet S, for example, based on a change in a read value of the sheet S in the sheet conveyance direction. For example, in the sheet conveyance direction, the leading end of the sheet S can be detected based on a change in the read value from black to white, and the trailing end of the sheet S can be detected based on a change in the read value from white to black. In addition, the upper scanner 221 detects a left end and a right end of the sheet S based on a change in a read value in the main scanning direction for the sheet S conveyed on the sheet conveyance path. For example, the left end of the sheet S can be detected based on a change in the read value from black to white, and the right end of the sheet S can be detected based on a change in the read value from white to black.

The upper scanner 221 can calculate an outer shape of the sheet S based on the detected leading end, trailing end, left end, and right end of the sheet S. In the present specification, the outer shape of the sheet S means a length of the sheet S in the sheet conveyance direction (hereinafter, simply referred to as a "length of the sheet") and a length of the sheet in a direction orthogonal to the sheet conveyance direction (hereinafter, referred to as a "width of the sheet"). Specifically, the upper scanner 221 can calculate a length MPL of the sheet S based on a difference (time difference) between detection timings of the leading end and the trailing end of the sheet S and a sheet conveyance speed. The upper scanner 221 can calculate a width MPW of the sheet S based on a difference between the position of the left end and the position of the right end of the sheet S. Similarly to the upper scanner 221, the lower scanner 231 can also calculate the outer shape of the sheet S (the length MPL and the width MPW of the sheet S) based on the leading end, the trailing end, the left end, and the right end of the sheet S.

The upstream reading device 200 outputs the length MPL and the width MPW of the sheet S measured by one of the upper scanner 221 or the lower scanner 231. Alternatively, it is also possible to adopt a configuration in which a mean value (=(L1+L2)/2) of a length (L1) of the sheet S measured by the upper scanner 221 and a length (L2) of the sheet S measured by the lower scanner 231 is output as the MPL. It is also possible to adopt a configuration in which a mean value (=(W1+W2)/2) of a width (W1) of the sheet S measured by the upper scanner 221 and a width (W2) of the sheet S measured by the lower scanner 231 is output as the MPW.

The communicator 240 exchanges a control signal or read image data between the upper scanner 221 and the lower scanner 223, and the image forming apparatus 300.

The detector 250 measures a moisture percentage (a physical property value related to an amount of moisture, and also referred to as a water content) of the sheet S (a sheet on which no image is formed) supplied from the sheet feed device 100 and conveyed on the sheet conveyance path. The detector 250 includes an optical sensor, a calculation controller, and a storage (none of which are illustrated). The optical sensor includes a light emitting element, a light receiving element, and optical elements such as a lens, an aperture, and a collimating lens, and irradiates the sheet S with light having a predetermined wavelength in a near-infrared region from the light emitting element and detects a reflected light by the light receiving element. The calculation controller estimates the moisture percentage of the sheet S by utilizing a property in which an absorptance of light having a predetermined wavelength in a near-infrared region changes in accordance with the moisture percentage of the sheet S. Specifically, the calculation controller calculates or acquires, for the sheet S, the moisture percentage corresponding to the measured absorptance based on a formula or a table representing a relation between the absorptance of light having a predetermined wavelength in the near-infrared region and the moisture percentage. The formula or the table is stored in the storage in advance, for example.

<Image Forming Apparatus 300>

The image forming apparatus 300 receives print image data from the printer controller 20 and prints an image on the sheet S based on the print image data.

In the present embodiment, it is assumed that the image forming apparatus 300 forms an image on one surface at a time on both surfaces when double-sided printing is set in the print setting data. That is, the image forming apparatus 300 is configured to form an image on one surface (front surface) of the sheet S, invert the front and back of the sheet S, and form an image on the other surface (back surface) of the sheet S.

The image forming apparatus 300 includes an image processor 310, an image former 320, a sheet feeder 330, a sheet conveyor 340, a fixer 350, a communicator 360, an operation display 370, and a controller 380. These constituent elements are communicably connected to each other via an internal bus 301.

The image processor 310 performs image processing, such as gamma correction, screen correction, and density balance, on the print image data received by the communicator 360. The image processor 310 transmits the processed image data to the image former 320.

The image former 320 forms an image on the sheet S based on image data by using a known image forming process such as an electrophotographic method including steps of charging, exposing, developing, and transferring. The image former 320 includes, for each color of yellow (Y), magenta (M), cyan (C), and black (K), a photosensitive drum as an image bearing member and a charger, an optical writer, a developing device, and a transferer that are disposed around the photosensitive drum.

Toner images in yellow (Y), magenta (M), cyan (C), and black (K) are formed on the respective photosensitive drums. The toner images are sequentially superimposed and primarily transferred to an intermediate transfer belt 321 of the transferer. The toner image primarily transferred to the intermediate transfer belt 321 is secondarily transferred to the sheet S.

The sheet feeder 330 supplies a sheet to the image former 320. The sheet feeder 330 includes a plurality of sheet feed trays and the sheet feed trays can respectively accommodate, for example, sheets of different sizes such as A4 and A3 sizes.

The sheet conveyor 340 includes a sheet conveyance path and a plurality of conveyance roller pairs and conveys the sheet S in the image forming apparatus 300. The sheet conveyor 340 also includes a sheet inverter and a circulation conveyor. The sheet conveyor 340 can invert the front and back of the sheet S subjected to fixing and eject the sheet S or can form an image on both surfaces of the sheet S.

The fixer 350 fixes a toner image formed on the sheet S. The fixer 350 includes a hollow heating roller inside which a heater is disposed and a pressure roller opposed to the heating roller. The heating roller and the pressure roller are controlled to be at a predetermined temperature (for example, 160° C. or more) by the heater and heated and pressed to the sheet S to fix the toner image.

The sheet S to which an image has been fixed is supplied to the downstream reading device 400 through a sheet ejector (not illustrated).

The communicator 360 is connected to, for example, the printer controller 20 via a network, and transmits and receives data such as print image data.

The operation display 370 includes an input section and an output section. The input section includes, for example, a keyboard, buttons, and a touch screen. The input section is used for a user to perform various instructions (inputs) such as character input by the keyboard, various settings, and an instruction to start printing by a print start button. The output section includes a display and is used to present the user with an execution status of a print job and the like.

The controller 380 controls the image processor 310, the image former 320, the sheet feeder 330, the sheet conveyor 340, the fixer 350, the communicator 360, and the operation display 370. As illustrated in FIG. 5, the controller 380 includes a CPU 381, an auxiliary storage device 382, a RAM 383, and a ROM 384.

The CPU 381 implements various functions by executing a control program P30 for the image forming apparatus 300. The control program P30 is stored in the auxiliary storage device 382 and is loaded onto the RAM 383 when the program is executed by the CPU 381. The auxiliary storage device 382 includes, for example, a large-capacity storage device such as an SSD and an HDD. The RAM 383 stores a calculation result and the like accompanied by the execution of the CPU 381. The ROM 384 stores various parameters, various programs, and the like.

<Downstream Reading Device 400>

The downstream reading device 400 reads a print image printed on the sheet S conveyed from the image forming apparatus 300 in response to an instruction from the controller 380. The downstream reading device 400 includes a sheet conveyor 410, an upper reader 420, a lower reader 430, and a communicator 440. These constituent element are communicably connected to each other via an internal bus 401. The sheet conveyor 410 and the communicator 440 have the same configurations as the sheet conveyor 210 and the communicator 240, respectively, in the upstream reading device 200. Therefore, the sheet conveyor 410 and the communicator 440 will not be described in detail. The upper reader 420 and/or the lower reader 430 constitute a first reader.

The upper reader 420 includes an upper scanner 421 installed on the upper side of a sheet conveyance path of the sheet conveyor 410, and a first background member 422 opposed to the upper scanner 421 and installed on the lower side of the sheet conveyance path. The lower reader 430 includes a lower scanner 431 installed on the lower side of the sheet conveyance path of the sheet conveyor 410, and a second background member 432 opposed to the lower scanner 241 and installed on the upper side of the sheet conveyance path.

The upper scanner 421 acquires read image data of the front surface of the sheet S by repeatedly scanning and reading an image formed on the front surface of the sheet S a plurality of times in the main scanning direction while the sheet S is being conveyed on the sheet conveyance path by the sheet conveyor 410. The lower scanner 431 acquires read image data of the back surface of the sheet S by repeatedly scanning and reading an image formed on the back surface of the sheet S in the main scanning direction a plurality of times while the sheet S is being conveyed on the sheet conveyance path by the sheet conveyor 410. The read image data of the front surface and the back surface read by the upper scanner 421 and the lower scanner 431 is transmitted to the controller 380 of the image forming system 30.

<Post-Processing Device 500>

The post-processing device 500 conveys or post-processes the sheet S supplied from the downstream reading device 400 in response to an instruction of the controller 380 and ejects the sheet S to outside of the image forming system 30. The post-processing device 500 includes a sheet conveyor 510, a post-processor 520, a sheet ejector 530, a communicator 540, and a controller 550. These constituent elements are communicably connected to each other via an internal bus 501.

The sheet conveyor 510 includes a sheet conveyance path and a plurality of conveyance roller pairs. The sheet conveyor 510 conveys the sheet S supplied from the downstream reading device 400 along the sheet conveyance path, and supplies the sheet S to the post-processor 520 or the sheet ejector 530.

The post-processor 520 performs post-processing on the conveyed sheet S. Examples of the post-processing include punching, cutting, and the like.

The sheet ejector 530 includes a sheet ejection tray and a sheet ejection roller pair. The sheet ejector 530 ejects, to the sheet ejection tray, the sheet S supplied from the downstream reading device 400 and conveyed along the sheet conveyance path or the post-processed sheet S.

The communicator 540 exchanges a control signal or data between the controller 550 and the image forming apparatus 300. The controller 550 controls the sheet conveyor 510, the post-processor 520, the sheet ejector 530, and the communicator 540. The hardware configuration of the controller 550, which is similar to the hardware configuration of the controller 380, will not be described in detail.

<Front-Back Alignment Control>

Figure 6:
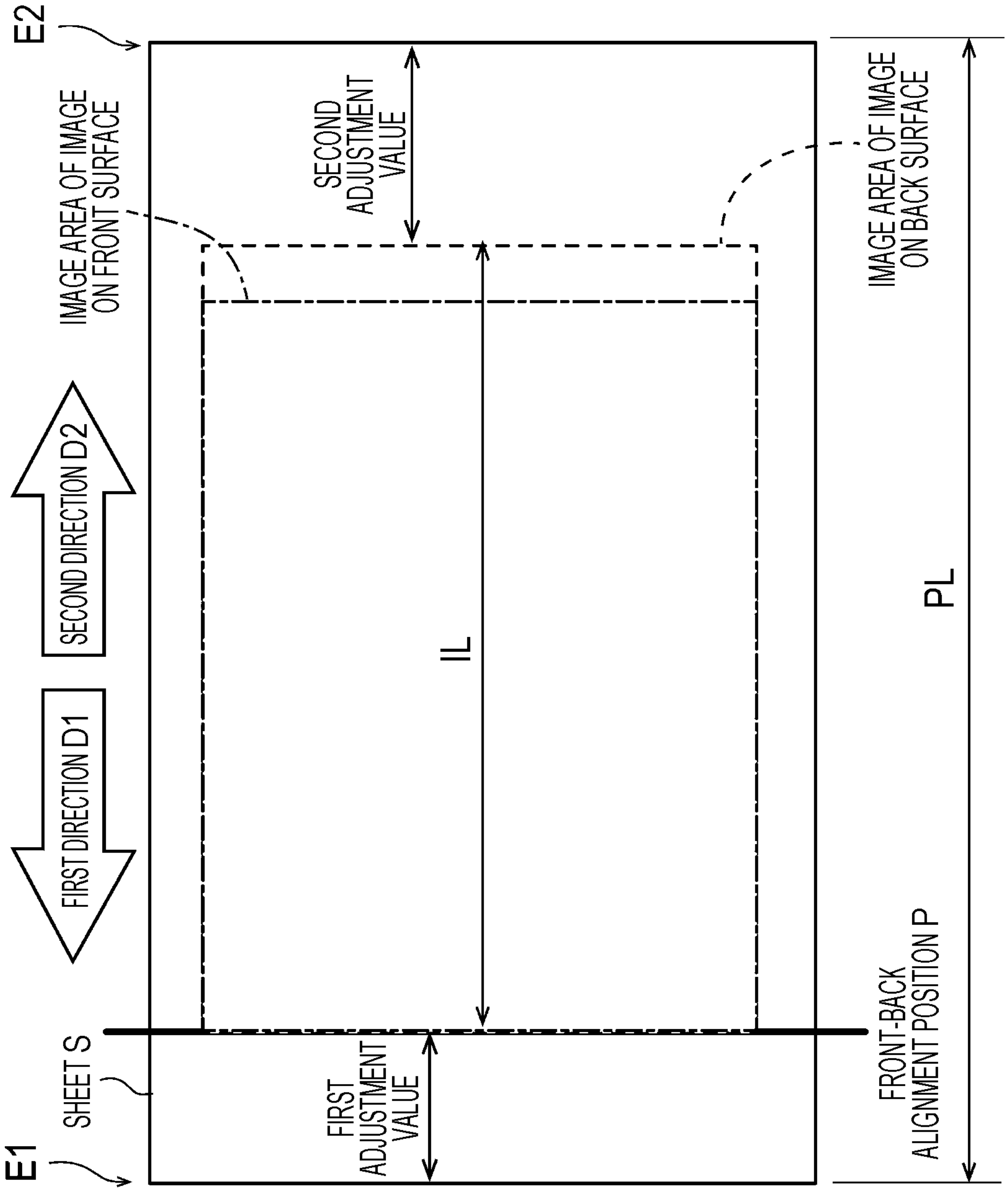
FIG. 6 is a conceptual diagram for describing control of aligning the positions of images formed on front and back of a sheet (feedforward front-back alignment control)
Figure 7:
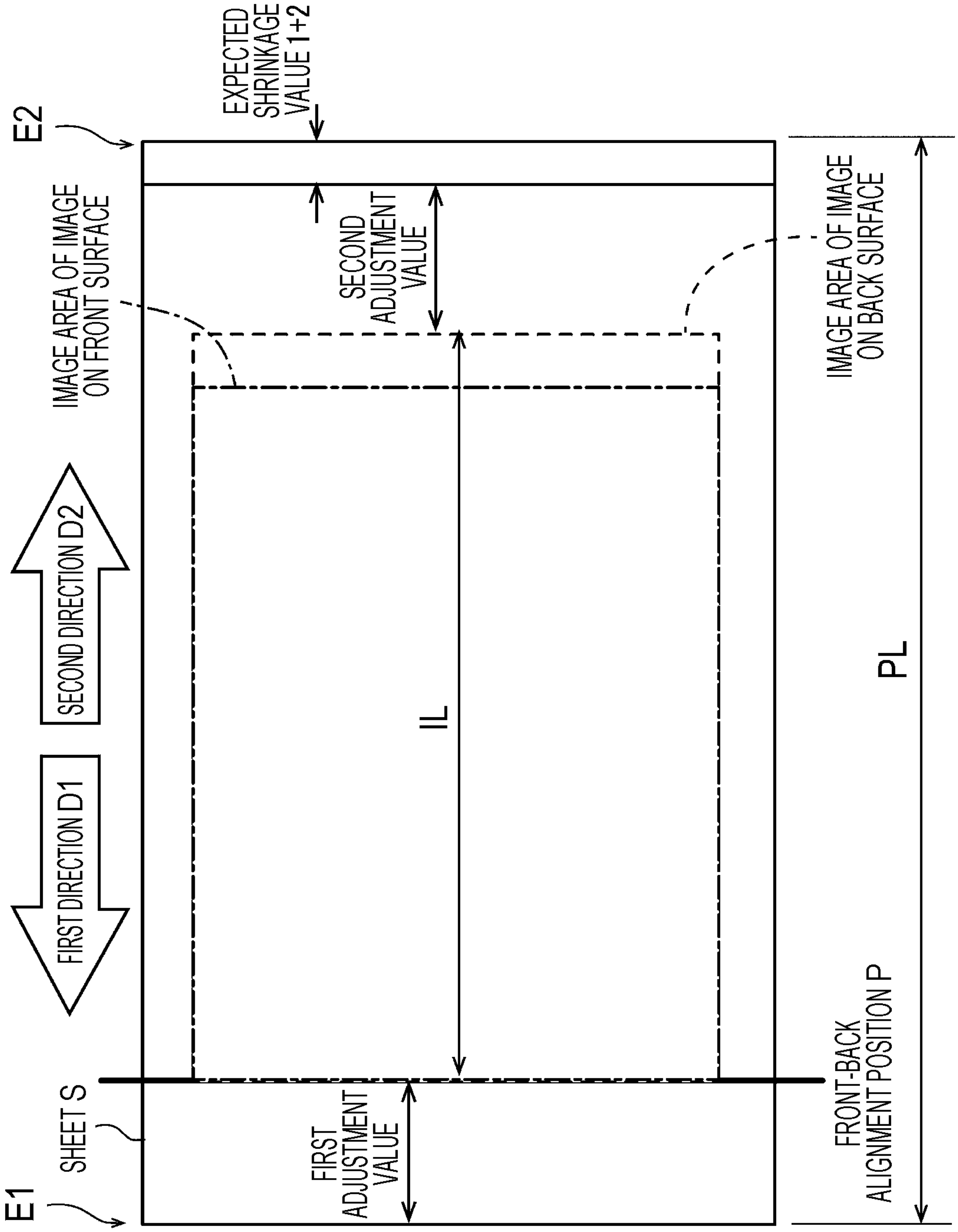
FIG. 7 is a conceptual diagram for describing feedforward front-back alignment control in consideration of shrinkage of a sheet.

FIG. 6 is a conceptual diagram for describing control of aligning the positions of the images formed on the front and back of the sheet S (feedforward front-back alignment control), and FIG. 7 is a conceptual diagram for describing feedforward front-back alignment control in consideration of a shrinkage of the sheet S. In FIGS. 6 and 7, areas (areas indicated by one dot chain lines and broken lines in FIGS. 6 and 7) of the images formed on both surfaces of the sheet S as viewed from the front surface of the sheet S are illustrated so as to overlap each other. As described above, the image forming apparatus 300 of the present embodiment is an image forming apparatus that forms images on both surfaces of the sheet S, one surface at a time, and is configured to form an image on the front surface of the sheet S, then invert the sheet S, and form an image on the back surface of the sheet S. When images are formed on both surfaces of the sheet S in the image forming apparatus having such a configuration, control is performed such that the position of the image formed on the back surface is aligned with the position of the image formed on the front surface in the sheet conveyance direction. Note that, in the present embodiment, a case is exemplified where the image on the back surface is longer than the image on the front surface in the sheet conveyance direction and the image on the front surface and the image on the back surface have the same width in the main scanning direction.

In FIG. 6, for example, the sheet conveyance direction when an image is formed on the front surface of the sheet S is defined as a first direction D1 (a direction from right to left in the drawing). Then, the sheet conveyance direction when an image is formed on the back surface of the sheet S is a second direction D2 (from left to right in the drawing) opposite to the first direction D1. When an image is formed on the front surface of the sheet S, the controller 380 controls the image former 320 to form an image from a position (image formation position on the front surface) separated by a first adjustment value in the direction from a leading end (E1) to a trailing end (E2) of the sheet S at the time of image formation on the front surface. The first adjustment value is, for example, input in advance by the user and stored in the auxiliary storage device 382. A range indicated by a one dot chain line in the drawing indicates an image area of the image on the front surface.

On the other hand, when an image is formed on the back surface of the sheet S, the controller 380 controls image formation on the back surface by the image former 320 so that the position of an end of the image area on the front surface and the position of an end of the image area on the back surface coincide with each other at a front-back alignment position P. A range indicated by a broken line represents the image area of the image on the back surface.

Specifically, the controller 380 forms the image on the back surface in the range indicated by the broken line. Therefore, the controller 380 controls the image former 320 to form an image from a position separated by a second adjustment value in the direction from the leading end (E2) to the trailing end (E1) of the sheet S at the time of image formation on the back surface to an image formation position on the back surface. Here, the second adjustment value is calculated by PL−(first adjustment value+IL), where PL is a length of the sheet S in the D2 direction, and IL is a length of the image on the back surface in the D2 direction. For example, the IL can be acquired based on image data. PL can be acquired based on a measurement result of the upstream reading device 200. The reason is as follows.

The image formation position on the back surface is calculated based on the length PL of the sheet S in the D2 direction. Therefore, if the lengths PL of the sheets supplied from the sheet feed device 100 in the D2 direction are always constant, the image formation positions on the back surface are also always constant, and the image formation positions on the front and back also coincide with each other. However, when there is a variation in the length PL of each sheet supplied from the sheet feed device 100, the image formation position on the back surface changes. As a result, a deviation occurs between the image formation positions on the front and back. Therefore, in the feedforward front-back alignment control of the present embodiment, the controller 380 measures the length PL of the sheet S in the D2 direction in the upstream reading device 200 and calculates the second adjustment value by using the measured length MPL of the sheet S. Accordingly, an image is formed on the back surface at the image formation position corresponding to the length MPL of the sheet S, and thus, the image formation positions on the front and back coincide with each other.

In this way, by controlling the position of the image on the back surface of the sheet S from the leading end of the sheet S (for example, the second adjustment value) in accordance with the first adjustment value set in advance for the front surface of the sheet S, the image formation positions on the front surface and the back surface can be controlled to be the front-back alignment position P.

In the image forming apparatus 300, when the sheet S is heated by the fixer 350, the sheet S shrinks in accordance with the moisture contained in the sheet S. In a case where both surfaces of the sheet S are fixed, the sheet S shrinks when the toner image formed on the front surface is fixed and further shrinks when the toner image formed on the back surface is fixed. As illustrated in FIG. 7, when an expected shrinkage value due to fixing of the front surface is an expected shrinkage value 1 and an expected shrinkage value due to fixing of the back surface is an expected shrinkage value 2, the expected shrinkage value due to the fixing of the front surface and the back surface is a value obtained by summing the expected shrinkage value 1 and the expected shrinkage value 2.

The controller 380 calculates (acquires) an expected shrinkage value corresponding to the measured moisture percentage (detection result) based on a formula or a table representing the relation between the moisture percentage of the sheet S and the expected shrinkage value of the sheet S due to fixing. The formula or the table is stored in the auxiliary storage device 382 in advance, for example. When an image is formed on the back surface of the sheet S, it is estimated that the sheet S has already shrunk by the expected shrinkage value 1 due to fixing of the front surface. Therefore, the controller 380 calculates the second adjustment value (=MPL−(the first adjustment value+IL+the shrinkage expected value 1 of the front surface)) in consideration of the expected shrinkage value 1, and sets a position separated from the leading end (E2) of the sheet by (the second adjustment value+IL+the expected shrinkage value 1 of the front surface) as the image formation position on the back surface.

<Method of Controlling Image Forming System 30>

As long as the length PL of the sheet S is measured accurately by the upstream reading device 200, the positions of the images formed on the front and back always coincide with each other by the feedforward front-back alignment control. However, when an error occurs in the expected shrinkage value calculated (acquired) from the moisture percentage of the sheet S, a deviation can occur in the image formation positions on the front and back. It is therefore possible to detect an abnormality (including a failure) of the detector 250 based on whether the image formation positions on the front and back coincide with each other.

Whether the image formation positions on the front and back coincide with each other can be determined by using markers called register marks for positional deviation detection (hereinafter, simply referred to as "register marks"). Specifically, the image former 320 forms an image including register marks on the sheet S at specific positions (for example, four corners of the image) of each of the images to be formed on the front surface and the back surface, and the downstream reading device 400 reads the register marks formed on each of the front surface and the back surface of the sheet S. When the positions of the register marks corresponding to the front-back alignment positions P on both the front surface and the back surface coincide with each other as a result of reading by the downstream reading device 400, it is determined that the image formation positions on the front surface and the back surface coincide with each other. On the other hand, when the positions of the register marks corresponding to the front-back alignment positions P on both the front surface and the back surface do not coincide with each other, it is determined that the image formation positions on the front surface and the back surface do not coincide with each other.

Figure 8:
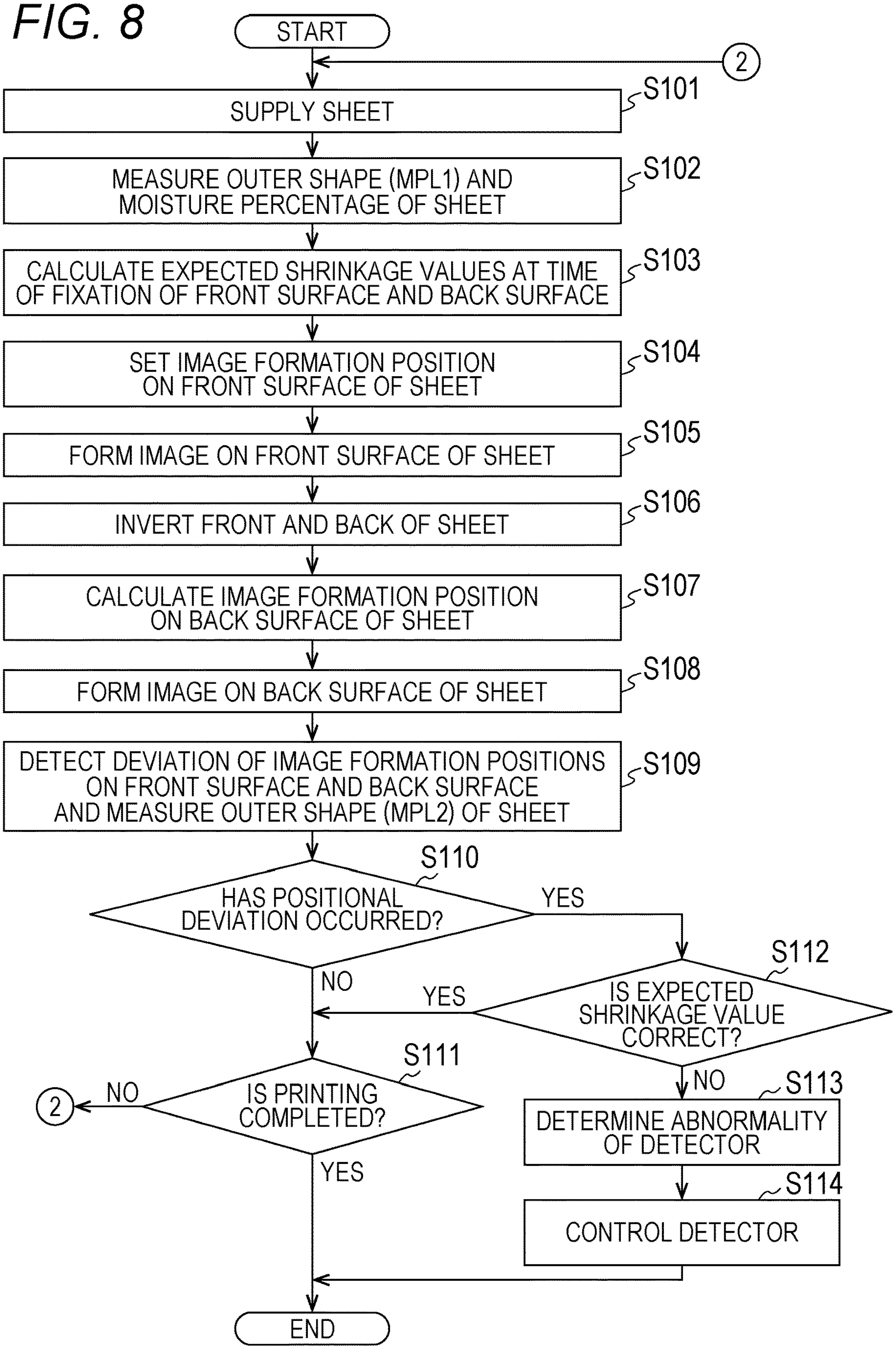
FIG. 8 is a flowchart exemplifying a processing procedure of a method of controlling the image forming system illustrated in FIG. 3.

Hereinafter, a method of controlling the image forming system 30 of the present embodiment will be described. FIG. 8 is a flowchart exemplifying a processing procedure of the method of controlling the image forming system 30 illustrated in FIG. 3. The processing in the flowchart illustrated in the drawing is implemented by the controller 380 and the controllers of the upstream reading device 200 and the downstream reading device 400 executing a control program and cooperating with each other.

First, the sheet feed device 100 supplies the sheet S (step S101). In response to a print instruction from the user, the controller 380 instructs the controller 140 to feed a sheet to the upstream reading device 200. The controller 140 supplies the sheet S to the upstream reading device 200 in response to the instruction of the controller 380.

Next, the upstream reading device 200 measures the outer shape and the moisture percentage of the sheet S (step S102). For example, the upper scanner 221 calculates a length MPL1 of the sheet S based on the difference between the detection timings of the leading end and the trailing end of the sheet S and the sheet conveyance speed. The detector 250 calculates (acquires) the absorptance of the sheet S and acquires the moisture percentage of the sheet S from the relationship between the absorptance and the moisture percentage represented by a formula or a table.

Next, the controller 380 calculates each of the expected shrinkage values 1 and 2 during at the time of fixing the front surface and the back surface (step S103). The controller 380 calculates (acquires) the expected shrinkage values 1 and 2 at the time of fixing of the front surface and the back surface, respectively, from the relationship between the moisture percentage and the expected shrinkage value represented by a formula or a table based on the moisture percentage of the sheet S calculated in step S102.

Next, the controller 380 sets the image formation position on the front surface of the sheet S (step S104). The controller 380 reads the first adjustment value from the auxiliary storage device 382, and sets the image formation position on the front surface of the sheet S to a position separated from the leading end of the sheet S by the first adjustment value (for example, the front-back alignment position P).

Next, the controller 380 forms an image on the front surface of the sheet S (step S105). The controller 380 controls the image former 320 to form an image including the register marks on the front surface of the sheet S from a position separated from the leading end (E1) of the sheet S by the first adjustment value.

Next, the controller 380 inverts the front and back of the sheet S (step S106). The controller 380 causes the sheet inverter of the sheet conveyor 340 to invert the front and back of the sheet S in the image forming apparatus 300.

Next, the controller 380 calculates an image formation position on the back surface of the sheet S (step S107). Specifically, based on the length MPL1 of the sheet S calculated in step S102, the controller 380 calculates the image formation position on the back surface of the sheet S corrected so that the positions of the register marks on the front surface and the back surface of the sheet S are aligned. More specifically, the controller 380 calculates the second adjustment value (=MPL1−(the first adjustment value+IL+the expected shrinkage value 1 of the front surface)) for the sheet S. The controller 380 sets, as the image formation position on the back surface, a position separated from the leading end (E2) of the sheet S at the time of the image formation on the back surface by (the second adjustment value+IL+the expected shrinkage value 1 of the front surface).

Next, the controller 380 forms an image on the back surface of the sheet S (step S108). The controller 380 controls the image former 320 to form, on the back surface of the sheet S, an image including register marks from a position separated from the leading end (E2) of the sheet S by the second adjustment value to the image formation position on the back surface.

Next, the downstream reading device 400 detects a deviation of the image formation positions on the front surface and the back surface, and measures the outer shape of the sheet S (step S109). The downstream reading device 400 reads the register marks on both the front surface and the back surface of the sheet S by the upper scanner 421 and the lower scanner 431. The downstream reading device 400 functions as a determiner, and determines that no deviation occurs between the position of the image formation position on the front surface and the position of the image formation position on the back surface when the positions of the register marks corresponding to the front-back alignment positions P on both the front surface and the back surface coincide with each other as a result of reading. For example, when a ratio of an area in which register marks on the front and back overlap is greater than or equal to a predetermined threshold value, the downstream reading device 400 determines that the positions of the register marks coincide with each other. On the other hand, when the positions of the register marks corresponding to the front-back alignment positions P on both the front surface and the back surface do not coincide with each other as a result of the reading, the determiner determines that a deviation occurs between the position of the image formation position on the front surface and the position of the image formation position on the back surface. The downstream reading device 400 measures the outer shape of the sheet S. For example, the upper scanner 421 calculates the length MPL2 of the sheet S based on the difference between the detection timings of the leading end and the trailing end of the sheet S and the sheet conveyance speed.

Next, when a positional deviation has not occurred (step S110: NO), the controller 380 determines whether the printing is completed (step S111). When the printing is completed (step S111: YES), the controller 380 ends the processing (END). On the other hand, when the printing is not completed (step S111: NO), the controller 380 returns to the processing of step S101.

On the other hand, when a positional deviation has occurred (step S110: YES), the controller 380 determines whether the expected shrinkage value is correct (step S112). The downstream reading device 400 determines whether the expected shrinkage value is correct based on whether a difference DL between the length MPL1 of the sheet S before image formation and the length MPL2 of the sheet S after image formation on both surfaces is equal to a total value TS of the expected shrinkage value 1 and the expected shrinkage value 2. The downstream reading device 400 determines that the expected shrinkage value is correct when the difference DL is substantially equal to the total value TS, and determines that the expected shrinkage value is not correct when the difference DL is not equal to the total value TS. When the expected shrinkage value is correct (step S112: YES), the processing proceeds to step S111. On the other hand, when the expected shrinkage value is not correct (step S112: NO), there is a possibility that an abnormality has occurred in at least one of the upstream reading device 200 or the downstream reading device 400. The downstream reading device 400 functions as a determiner.

When it is known that no abnormality has occurred in the downstream reading device 400, the downstream reading device 400 determines a cause of the occurrence of the positional deviation is due to an abnormality of the upstream reading device 200 (detector 250) and determines the abnormality of the detector 250 (step S113).

Next, the downstream reading device 400 controls the detector 250 (step S114). The downstream reading device 400 causes the detector 250 to detect a proof sheet again in the following case to confirm the presence or absence of an abnormality of the detector 250 and perform calibration. The case is a case where it is not possible to determine which of the detector 250 or the downstream reading device 400 has an abnormality, or a case where it is determined that the detector 250 has an abnormality. Specifically, the downstream reading device 400 requests the controller 380 to supply a proof sheet for calibrating the measurement of the moisture percentage by the detector 250, and the detector 250 detects the supplied proof sheet and confirms whether the detection is correctly performed. When the detection by the detector 250 is not correctly performed, the downstream reading device 400 can control the detector 250 to correct the moisture percentage. The proof sheet is a sheet whose accurate moisture percentage is known in advance by measurement.

Although a case where the detector 250 measures the moisture percentage of the sheet has been described above as an example, the detector 250 may include a sensor that measures a thickness (sheet thickness), basis weight, surface property, and the like of the sheet. For example, in a case where the detector 250 includes a sensor that measures the sheet thickness, the downstream reading device 400 requests the controller 380 to supply a proof sheet for calibrating the measurement of the sheet thickness by the detector 250. The detector 250 detects the supplied proof sheet, and confirms whether the detection is correctly performed. When the detection by the detector 250 is not correctly performed, the downstream reading device 400 can control the detector 250 to correct the sheet thickness. The proof sheet is a sheet whose accurate sheet thickness is known in advance by measurement. Therefore, when it cannot be determined which of the detector 250 or the downstream reading device 400 has an abnormality, the downstream reading device 400 can determine the presence or absence of an abnormality in the detector 250 by calibrating the detector 250. Note that the calibration of the detector 250 is preferably minimized from the viewpoint of maintaining productivity.

As described above, in the processing of the flowchart illustrated in FIG. 8, after supplying the sheet S, the image forming system 30 measures the outer shape and the moisture percentage of the sheet S, and calculates the expected shrinkage values at the time of fixing of the front surface and the back surface. Next, the image forming system 30 sets an image formation position on the front surface of the sheet S, forms an image on the front surface of the sheet S, inverts the front and back of the sheet, calculates an image formation position on the back surface of the sheet S, and forms an image on the back surface of the sheet S. Then, the image forming system 30 detects a positional deviation between the image formation position on the front surface and the image formation position on the back surface, and when the positional deviation occurs and the expected shrinkage value is not correct, the image forming system 30 determines the abnormality of the detector 250 and controls the detector 250.

The image forming system 30 of the present embodiment described above can achieve the following effects.

Since the image forming system 30 determines the abnormality of the detector 250 and controls the detector 250, it is possible to suppress an increase in downtime due to complication of the configuration of the image forming system 30. Since the second adjustment value is calculated in consideration of a shrinkage of the sheet S due to the fixing and the abnormality of the detector 250 is determined, it is possible to improve accuracy of abnormality determination of the detector 250.

Second Embodiment

In the first embodiment, a case has been described where an abnormality of the detector 250 is determined. In a second embodiment, a case will be described where an abnormality in the downstream reading device 400 is determined. In the second embodiment, the lengths of the sheet before and after the image formation are measured by the upstream reading device 200 and the downstream reading device 400, respectively. Then, an abnormality in the downstream reading device 400 is determined based on whether the length of the sheet after image formation that has shrunk due to heating for fixing is shorter than the length of the sheet before image formation. In order to avoid redundant description, the same configuration as in the first embodiment will not be described in detail.

Figure 9:
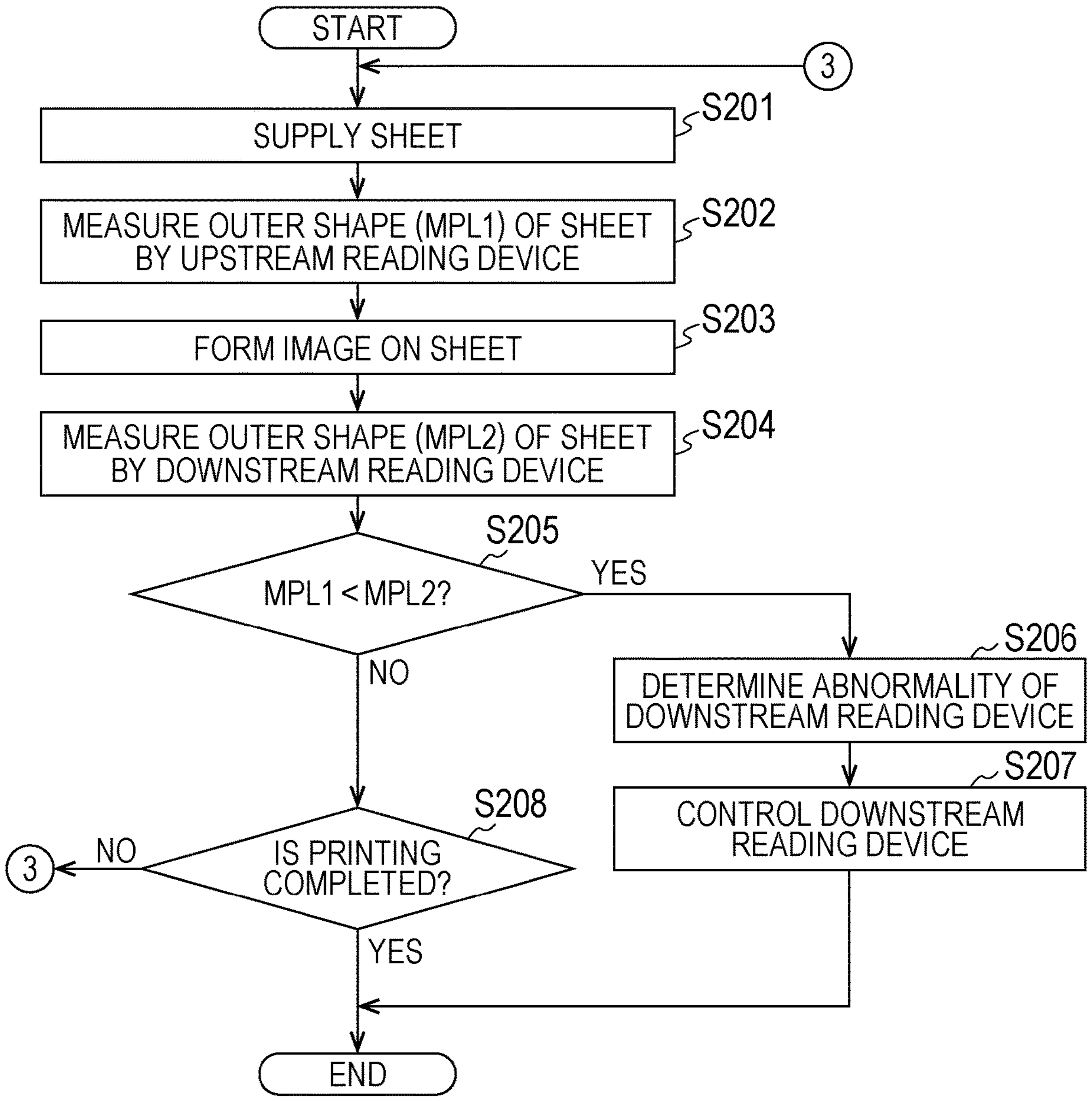
FIG. 9 is a flowchart exemplifying a processing procedure of a method of controlling a printing system according to a second embodiment of the present invention.

FIG. 9 is a flowchart exemplifying a processing procedure of a method of controlling the image forming system 30 according to the second embodiment. The processing in the flowchart illustrated in the drawing is implemented by the controller 380 and the controllers of the upstream reading device 200 and the downstream reading device 400 executing a control program and cooperating with each other.

First, the sheet feed device 100 supplies the sheet S (step S201). In response to a print instruction from the user, the controller 380 instructs the controller 140 to feed a sheet to the upstream reading device 200. The controller 140 supplies the sheet S to the upstream reading device 200 in response to the instruction of the controller 380.

Next, the upstream reading device 200 measures the outer shape of the sheet S (step S202). For example, the upper scanner 221 calculates a length MPL1 of the sheet S based on the difference between the detection timings of the leading end and the trailing end of the sheet S and the sheet conveyance speed.

Next, the controller 380 forms an image on the sheet S (step S203). The controller 380 causes the image forming apparatus 300 to form, for example, a predetermined image on the front surface of the sheet S.

Next, the downstream reading device 400 measures the outer shape of the sheet S (step S204). For example, the upper scanner 421 calculates the length MPL2 of the sheet S based on the difference between the detection timings of the leading end and the trailing end of the sheet S and the sheet conveyance speed. Note that after the length MPL1 of the sheet S is measured by the upstream reading device 200, the length MPL2 of the sheet S is measured again by the downstream reading device 400, and thus, the length MPL2 of the sheet S after shrinkage can be reflected in conveyance control. As a result, the downstream reading device 400 can implement accurate control of conveyance of the sheet S to the post-processing device 500. The downstream reading device 400 transmits the measured length MPL2 of the sheets S to the upstream reading device 200.

Next, the upstream reading device 200 compares the lengths MPL1 and MPL2 of the sheet S (step S205). The upper scanner 221 functions as a determiner, and when MPL1<MPL2 (step S205: YES), the upper scanner 221 determines an abnormality of the downstream reading device 400 (step S206). The sheet S is estimated to have shrunk by the expected shrinkage value 1 due to the fixing of the front surface. Therefore, when the upstream reading device 200 (detector 250) and the downstream reading device 400 are normal, comparing the lengths MPL1 and MPL2 of the sheet S, it is assumed that MPL1>MPL2. Therefore, when MPL1<MPL2, it is considered that an abnormality has occurred in the downstream reading device 400. Note that the upstream reading device 200 can be confirmed to be normal by determining with another abnormality determination algorithm or by calibrating the upstream reading device 200 with a proof sheet.

Next, the detector 250 controls the downstream reading device 400 (step S207). A possible reason why the length of the sheet S cannot be accurately measured in the downstream reading device 400 is, for example, that a background applied when the sheet S is read is not appropriate. Therefore, the calculation controller of the detector 250 performs control so as to rotate the first background member 422 and/or the second background member 432 with respect to the downstream reading device 400 and perform re-reading of the sheet S as an appropriate background.

Another possible reason why the length of the sheet S cannot be accurately measured is, for example, that a parameter used by the downstream reading device 400 for reading the sheet S is not appropriate. Examples of the parameter include white balance, a black level, and a white level. For example, the calculation controller of the detector 250 can request the controller 380 to feed a proof sheet for calibrating white and control the downstream reading device 400 to correct white balance.

On the other hand, when MPL1<MPL2, that is, MPL1≥MPL2 (step S205: NO), the downstream reading device 400 is normal. The controller 380 determines whether the printing is completed (step S208). When the printing is completed (step S208: YES), the controller 380 ends the processing (END). On the other hand, when the printing is not completed (step S208: NO), the controller 380 returns to the processing of step S201.

As described above, in the processing of the flowchart illustrated in FIG. 9, the image forming system 30 measures the length MPL1 of the sheets S by the upstream reading device 200 after supplying the sheets S to the upstream reading device 200. After forming an image on the sheet S, the image forming system 30 measures the length MPL2 of the sheet S by the downstream reading device 400. Then, the image forming system 30 compares the MPL1 with the MPL2, and when the MPL2 is larger than the MPL1, the image forming system 30 determines that an abnormality has occurred in the downstream reading device 400 and controls the downstream reading device 400.

The image forming system 30 of the present embodiment described above can achieve the following effects in addition to the effects of the first embodiment.

Since the image forming system 30 determines the abnormality of the downstream reading device 400 and controls the downstream reading device 400, it is possible to further suppress an increase in downtime due to complication of the configuration of the image forming system 30.

Even when it is difficult to determine in which of the detector 250 or the downstream reading device 400 an abnormality has occurred in the first embodiment, the abnormality of the detector 250 can be determined unless the abnormality of the downstream reading device 400 is determined in the second embodiment. Conversely, even when it is difficult to determine in which of the detector 250 or the downstream reading device 400 an abnormality has occurred in the second embodiment, the abnormality of the downstream reading device 400 can be determined unless the abnormality of the detector 250 is determined in the first embodiment. In addition, by combining the first embodiment and the second embodiment, the detector 250 and the downstream reading device 400 can control each other based on the respective reading results.

As described above, in the embodiment, the image forming system 30 and the method of controlling the image forming system 30 have been described. However, it is needless to say that those skilled in the art can appropriately perform addition, modification, and omission in the present invention within the scope of the technical idea.

For example, in the first and second embodiments, a case has been described where the upstream reading device 200 or the downstream reading device 400 functions as a determiner. However, the present invention is not limited to such a case, and the controller 380 of the image forming apparatus 300 may be configured to function as a determiner.

The control program may be provided by a computer-readable recording medium, such as a USB memory, a flexible disk, or a CD-ROM, or may be provided online via a network, such as the Internet. In this case, the program recorded on the computer-readable recording medium is usually transferred to and stored in a memory, a storage, or the like. Alternatively, this inspection program may be provided, for example, as independent application software, or may be incorporated into software of each device as a function of a server.

Furthermore, a part or a whole of the processing executed by the inspection program in the embodiments can be replaced with hardware such as a circuit to be executed.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:

an image former that forms an image on a recording medium;

a detector that is provided upstream of the image former in a conveyance direction of the recording medium and detects a physical property of the recording medium;

a first reader that is provided downstream of the image former in the conveyance direction of the recording medium and reads the recording medium;

a determiner that determines an abnormality of at least one of the detector or the first reader based on a detection result of the detector and a reading result of the first reader, a controller for controlling at least one of the first reader or the detector based on the abnormality determination.

2. The image forming system according to claim 1, further comprising:

a second reader that is provided upstream of the image former in the conveyance direction of the recording medium and reads the recording medium; and a fixer that fixes the image formed by the image former to the recording medium, wherein the first reader reads the recording medium after fixing by the fixer, the detector detects a moisture percentage of the recording medium, and the determiner determines the abnormality of at least one of the detector or the first reader based on the moisture percentage detected by the detector, a size of the recording medium based on the reading result of the first reader, and a size of the recording medium based on the reading result of the second reader.

3. The image forming system according to claim 1, further comprising:

a second reader that is provided upstream of the image former in the conveyance direction of the recording medium and reads the recording medium; and a fixer that fixes the image formed by the image former to the recording medium, wherein the first reader reads the recording medium after fixing by the fixer, the detector detects a moisture percentage of the recording medium, and the determiner determines the abnormality of at least one of the detector or the first reader based on the moisture percentage detected by the detector, a size of the recording medium based on the reading result of the second reader, and a distance from an end of the conveyance direction of the recording medium to the image formed based on the reading result of the first reader.

4. The image forming system according to claim 1, wherein the first reader is controlled based on the detection result of the detector, and the detector is controlled based on the reading result of the first reader.

5. A method of controlling an image forming system including an image former that forms an image on a recording medium, a detector that is provided upstream of the image former in a conveyance direction of the recording medium and detects a physical property of the recording medium, a first reader that is provided downstream of the image former in the conveyance direction of the recording medium and reads the recording medium, and a controller for controlling at least one of the first reader or the detector based on an abnormality determination, the method comprising:

detecting, by the detector, a physical property of a recording medium on which no image is formed;

forming an image on the recording medium by the image former;

reading, by the first reader, the recording medium on which the image is formed; and determining an abnormality of at least one of the detector or the first reader based on a detection result of the detector and a reading result of the first reader.

* * * * *